Aug. 19, 1941.  F. PORSCHE  2,252,861
TRACTOR
Filed May 4, 1940
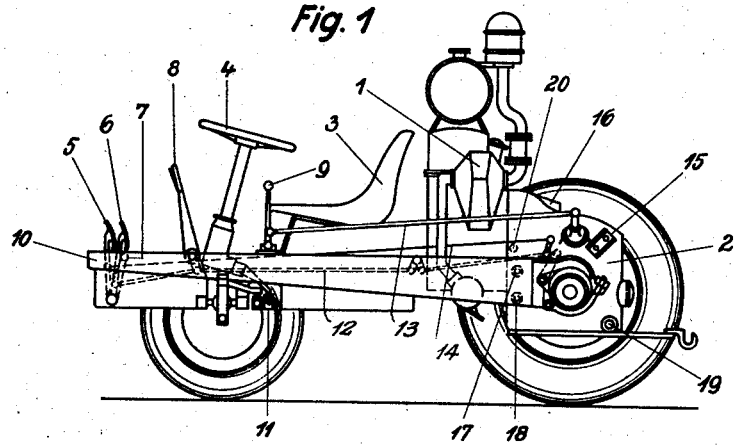
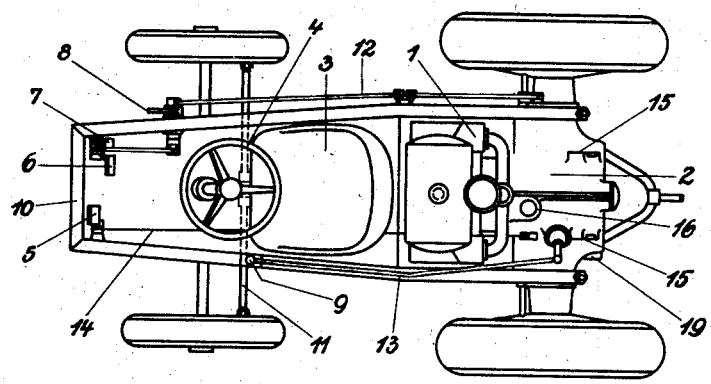
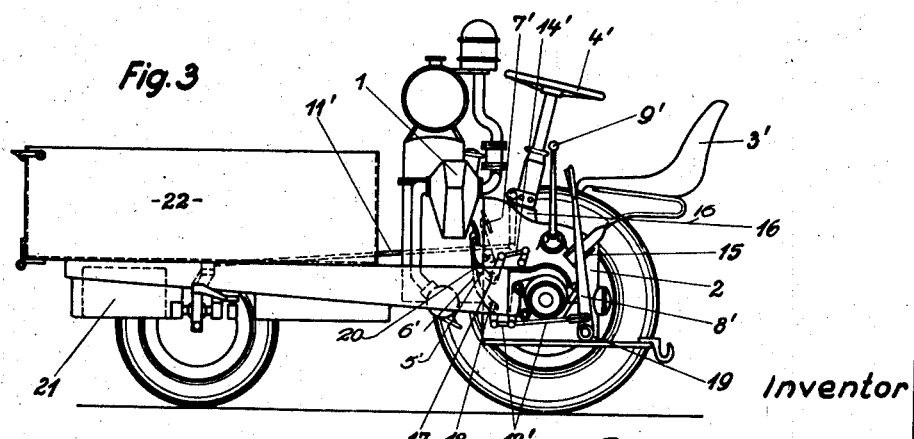
Inventor
Ferdinand Porsche
By
Attorneys Patented Aug. 19, 1941

2,252,861

UNITED STATES PATENT OFFICE 2,252,861

TRACTOR

Ferdinand Porsche, Stuttgart, Germany, assignor to Dr. ing. h. c. F. Porsche K.-G., Stuttgart-Zuffenhausen, Germany, a company of Germany Application May 4, 1940, Serial No. 333,278
In Germany May 8, 1939

3 Claims. (Cl. 180—77)

The present invention relates to tractors and has for an object the provision of improved devices of this type capable of a plurality of types of uses.

Tractors are known in which the seat is located in the front. In them the driver's seat together with the steering and the various control and actuating levers are to be found forwardly, accordingly in front of the driving engine, as this is most desirable for street traveling with trailers because of the free forward view. Because of their general arrangement, such tractors however have no useful loading space whatsoever and are not well adapted for farm purposes, since the driver cannot see how the ground working apparatus is working and for plowing does not offer the possibility of proper steering to correctly locate the furrow.

On the other hand, tractors are known in which the driving engine is positioned forwardly and lies ahead of the driver's seat. These have obviously no useful loading space but are designed solely for drawing farm implements.

Heretofore, both constructions have been achieved by totally different arrangements. For this reason the production of tractors was relatively expensive, because in the production for a definite use two different constructional forms had to be provided, which in their details differed greatly from one another. Additionally, for the purchaser there was the disadvantage that the usability of a particular tractor construction was limited.

It is an object of this invention to avoid the said disadvantages in that in the case of tractors with rearwardly lying driving engines the operator's seat with the members necessary for the actuation and control of the tractor, as the steering, hand and foot brake, clutch and gas levers, gear shift lever, etc., are so constructed that they can be positioned alternately frontwardly or rearwardly relatively to the driving engine whereby the tractor is, in the first case, adapted for general purposes and in the second case is especially adapted for use as a farm tractor. The tractors of the arrangement according to the invention are accordingly although adapted for both uses, that is whether the operator's seat lies before or behind the driving engine, completely similar to one another in all their important parts, as frame, driving engine, clutch, speed-change transmission drive, rear axle drive, and driving mechanism, and differ from one another merely in the location of the operator's seat and the different arrangement of controlling linkages. All of these differences include only parts which are cheap in their production cost and are applied only at the end of the process of assembly. The production of the fundamental parts is accordingly the same and, in consequence of this, greatly cheapened. Furthermore, the stocking of all parts, whether for production or for replacement is simplified in the highest degree, because the parts which frequently require replacement are the same for each construction. This results in a further great saving.

It is another object of the invention to provide a construction which, even after use will permit of conversion to another form, as from farm tractor to one for military use, since it is possible to readily change farm tractors into tractors with the driver's seat lying in front of the driving engine, which is especially of importance for transportation in columns.

It is another object of the invention to construct the driving engine, the clutch, the speed-change drive, and the rear axle drive as a compact unit, in which case these parts can preferably be combined into a power unit of a short constructional length. In addition to the advantages which have been clearly set forth in the case of tractors with the operator's seat lying behind the driving engine, there is the special advantage that a useful load carrying space can be provided in front of the driving engine or in front of the power unit. The tractor is then designed for the direct carrying of loads without the use of trailers. Furthermore, there is also given the possibility to build upon the load carrying surface a gas generator arrangement for the driving engine without making the tractor unduly cumbersome.

Also for military purposes the possibility of providing a loading surface is of value, for without difficulty it is possible to position light arms as machine guns upon the same, be they for ground warfare or anti-aircraft purposes. For the transportation of gunners for these weapons and for munition supply this construction with corresponding additional structures is particularly adapted. Thus, it is possible to readily convert a farm tractor into a road vehicle for general or military use.

Other objects will appear from the following description of an illustrative embodiment of the invention taken together with the attached drawing wherein:

Fig. 1 is a side view of a tractor having the operator's seat lying before the driving engine;

Fig. 2 is a corresponding plan view; and

Fig. 3 is a side view of the tractor of the type shown in Fig. 1 with the operator's seat lying behind the driving engine. In this figure, as also in Fig. 1, the left wheels have been omitted for the sake of clarity of the disclosure.

The tractor, according to Figs. 1 and 2, consists of a driving engine 1 lying at the rear with which is combined the clutch, the speed-change transmission and the rear axle drive as a power unit 2. The operator's seat 3 is mounted directly in front of the power unit 2 preferably on a support or supports received in sockets carried by the frame. Correspondingly, the steering wheel 4, the clutch pedal 5, the brake pedal 6, the gas pedal 7, the hand brake lever 8, and the gear shift lever 9 are positioned upon the frame 10 in convenient locations and actuate the different devices as through rods 11 for the steering, 12 for the foot and hand brakes, 13 for the speed-change transmission, and finally through the wire 14 for the clutch.

The tractor, according to Figs. 1 and 2, is as previously set forth developed in such a manner that the operator's seat can also be transferred to a position behind the driving engine. For this purpose the power unit has in designated positions lugs 15, 15 for the attachment of the driver seat, cast on socket 16 for the attachment of the steering means, and finally correspondingly formed lugs 17, 18, 19, 20 for the attachment of the different control and actuating levers.

As has already been mentioned, the driving engine 1 combined with the clutch, with the speed-change transmission, and with the rear axle drive, is formed as a power unit 2 of short constructional length, above which the fuel container for the driving engine may rest.

Fig. 3 shows the tractor with the operator's seat 3' transferred behind the driving engine 1. To this end its support is attached to or received in sockets formed in the lugs 15, 15'. The steering wheel 4', which may be the same as the wheel 4 and which operates another linkage 11', is shown transferred to the cast on steering column receiving holder 16. The clutch pedal 5' is pivoted on the lug 17, which through the linkage 14' acts upon the clutch. The brake pedal 6' is pivoted on the lug 18 and the hand brake lever 8' on the lug 19, and through the link 12' actuates the brake. The gear shift lever 9' has been transferred to a position where it works directly upon the speed-change transmission and accordingly needs no linkage. The gas pedal 7' is supported upon the lug 20; however here, as also in the case of Fig. 1, for the sake of clarity, its linkage has been omitted.

The tractor according to Fig. 3 is particularly adapted for farm purposes, since the driver can observe the operation of the soil working apparatus. The free space remaining in front of the driving unit permits the supplemental loading weights 21 to be added if needed to provide the necessary axle loading. In the example of Fig. 3, a platform body 22 is shown provided in front of the driving unit 2, upon which, for example, loads can be placed for transportation to and from the fields.

It will also be apparent that the operator's seat may, if desired, be placed over the driving engine or over the power unit, especially then if, for example, the driving motor is of the flat type, as when provided with horizontal opposed cylinders. In this manner, that arrangement may be chosen in which the driving engine lies behind the clutch and the speed-change transmission and not before it as in the example given. Also, in these cases, the advantages already given are present: the provision of tractors of two types—with operator's seat before the driving engine or operator's seat behind or above the driving engine, so that the construction is substantially simplified and cheapened, the keeping in stock of the original and the replacement parts simplified, and the possibility given of converting a tractor of a particular type with little expense to one of another type.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. In a tractor having ground wheels, a motor with means for connecting said motor with at least one of said ground wheels for driving the latter including a clutch and speed-change mechanism, and means for steering at least one of said ground wheels, the combination therewith of an operator's seat located in advance of said motor, and steering, speed-change and clutch controlling mechanism located adjacent to said operator's seat and means whereby said operator's seat may at will be transferred to the rear of said motor together with means adjacent to said operator's seat when in said rearward position for controlling said steering, speed-change and clutch controlling mechanism.

2. In a tractor having ground wheels, a motor with means for connecting said motor with at least one of said ground wheels for driving the latter including a clutch and speed-change mechanism, and means for steering at least one of said ground wheels, the combination therewith of an operator's seat located in advance of said motor, and steering, speed-change and clutch controlling mechanism located adjacent to said operator's seat and means whereby said operator's seat may at will be transferred to the rear of said motor together with means adjacent to said operator's seat when in said rearward position for controlling said steering, speed-change and clutch controlling mechanism, together with load carrying means located forwardly of said engine when the operator's seat and said controlling means are located rearwardly thereof.

3. In a tractor, the combination according to claim 1 in which the engine, the clutch, the speed-change mechanism and the ground wheel drive mechanism are constructed as a single compact unitary power unit which is unchanged when the tractor is converted from one type to another.

FERDINAND PORSCHE.